United States Patent
Bennett

(10) Patent No.: US 6,519,895 B1
(45) Date of Patent: Feb. 18, 2003

(54) FISH HOOK

(76) Inventor: Thomas Joseph Bennett, 309 Mandy Ave., Independence, MO (US) 64056

(*) Notice: Subject to any disclaimer, the term of this patent is extended or adjusted under 35 U.S.C. 154(b) by 0 days.

(21) Appl. No.: 09/576,054

(22) Filed: May 23, 2000

(51) Int. Cl.[7] ............................................. A01K 83/00
(52) U.S. Cl. ...................... 43/44.81; 43/42.39; 43/43.16
(58) Field of Search .............................. 43/43.16, 44.2, 43/44.81, 42.39

(56) References Cited

U.S. PATENT DOCUMENTS

| | | | | |
|---|---|---|---|---|
| 648,552 A | * | 5/1900 | Crane | 43/43.16 |
| 1,103,707 A | * | 7/1914 | Threm | 43/44.81 |
| 1,961,378 A | * | 6/1934 | Mitchell | 43/44.2 |
| 2,531,981 A | * | 11/1950 | Liebe | 43/43.16 |
| 2,825,173 A | * | 3/1958 | Gederos | 43/44.2 |
| 3,023,536 A | * | 3/1962 | Williams | 43/43.2 |
| 3,344,549 A | * | 10/1967 | Peters et al. | 43/42.39 |
| 3,605,317 A | * | 9/1971 | Pobst | 43/42.25 |
| 3,750,323 A | * | 8/1973 | Weis | 43/42.39 |
| 3,803,746 A | * | 4/1974 | Riggs | 43/35 |
| 3,868,784 A | * | 3/1975 | Sabol | 43/42.39 |
| 4,060,928 A | * | 12/1977 | Messler et al. | 43/43.16 |
| 4,219,956 A | * | 9/1980 | Hedman | 43/42.39 |
| 4,803,798 A | * | 2/1989 | Hannah | 43/42.36 |
| 4,819,366 A | * | 4/1989 | Manno | 43/44.81 |
| 4,835,898 A | * | 6/1989 | Pond | 43/43.16 |
| 4,862,632 A | | 9/1989 | Kattenberg | 43/43.16 |
| 4,907,364 A | * | 3/1990 | Hedman | 43/42.39 |
| 5,138,790 A | * | 8/1992 | McManus | 43/43.16 |
| 5,214,875 A | * | 6/1993 | Hoben et al. | 43/43.16 |
| 5,220,743 A | * | 6/1993 | McClellan | 43/44.81 |
| 5,335,443 A | * | 8/1994 | Grigsby, Jr. | 43/44.81 |
| 5,373,658 A | * | 12/1994 | Huppert | 43/42.39 |
| 5,664,364 A | * | 9/1997 | Clark | 43/43.16 |
| 5,901,494 A | * | 5/1999 | Reed | 43/44.81 |
| 6,032,402 A | | 3/2000 | Jilling et al. | 43/43.6 |
| 6,038,806 A | | 3/2000 | Maitland | 43/4.5 |
| 6,122,857 A | * | 9/2000 | Rhoten | 43/43.16 |

FOREIGN PATENT DOCUMENTS

| | | | |
|---|---|---|---|
| JP | 9-308411 | * | 12/1997 |
| JP | 11-113446 | * | 4/1999 |
| JP | 11-151054 | * | 6/1999 |
| JP | 11-262345 | * | 9/1999 |

OTHER PUBLICATIONS

Bass Pro Shops, "1999 Spring Fever Sale", Jan. 1999, Ultrahead Jigs by Owner, C. Bullet Head 4 pk., p. 116 and XPS Premium Hooks, Mustad Mega–Bite Worm Hook, p. 125.*

XPS™ Extreme Jigheads, Item No. D, "Tender Tube Weedless", *Bass Pro Shops 2000 Master Catalog*, p. 173, published Dec., 1999.

Oldham's Weedless Tube Lure Heads, Item No. A, *Bass Pro Shops 2000 Master Catalog*, p. 173, published Dec., 1999.

Surelock™ Weedless, Item No. B, *Bass Pro Shops 2000 Master Catalog*, p. 173, published Dec., 1999.

(List continued on next page.)

*Primary Examiner*—Darren W. Ark
(74) *Attorney, Agent, or Firm*—Shook, Hardy & Bacon LLP

(57) ABSTRACT

A fish hook is provided which includes an elongated shank having a first attaching end and a second end. A locking bend shoulder extends at an angle from the second end of the shank. A weight is secured to the shank between the first attached end and the second end of the shank. The weight is located at a distance from the locking bend shoulder so that the bait is capable of being secured on the shank. The fish hook has a curved section terminating in a barb section. The barb section of the hook is axially aligned with the shank so that the bait is properly balanced on the hook when secured to the shank and the barb section.

2 Claims, 1 Drawing Sheet

OTHER PUBLICATIONS

Oldham's Weedless Moss Head Screwlock Jig, Item No. C, *Bass Pro Shops 2000 Master Catalog,* p. 173, published Dec., 1999.

UltraHead™ Jigs with Owner™ Super Needle Point Hooks, Item Nos. A–E, *Bass Pro Shops 2000 Master Catalog*, p. 174, published Dec., 1999.

Gamakatsu® "Superline Worm Hook", Item No. D, *Bass Pro Shops 2000 Master Catalog,* p. 206, published Dec., 1999.

Gamakatsu® "Extra Wide Gap Worm", Item No. E, *Bass Pro Shops 2000 Master Catalog,* p. 206, published Dec., 1999.

* cited by examiner

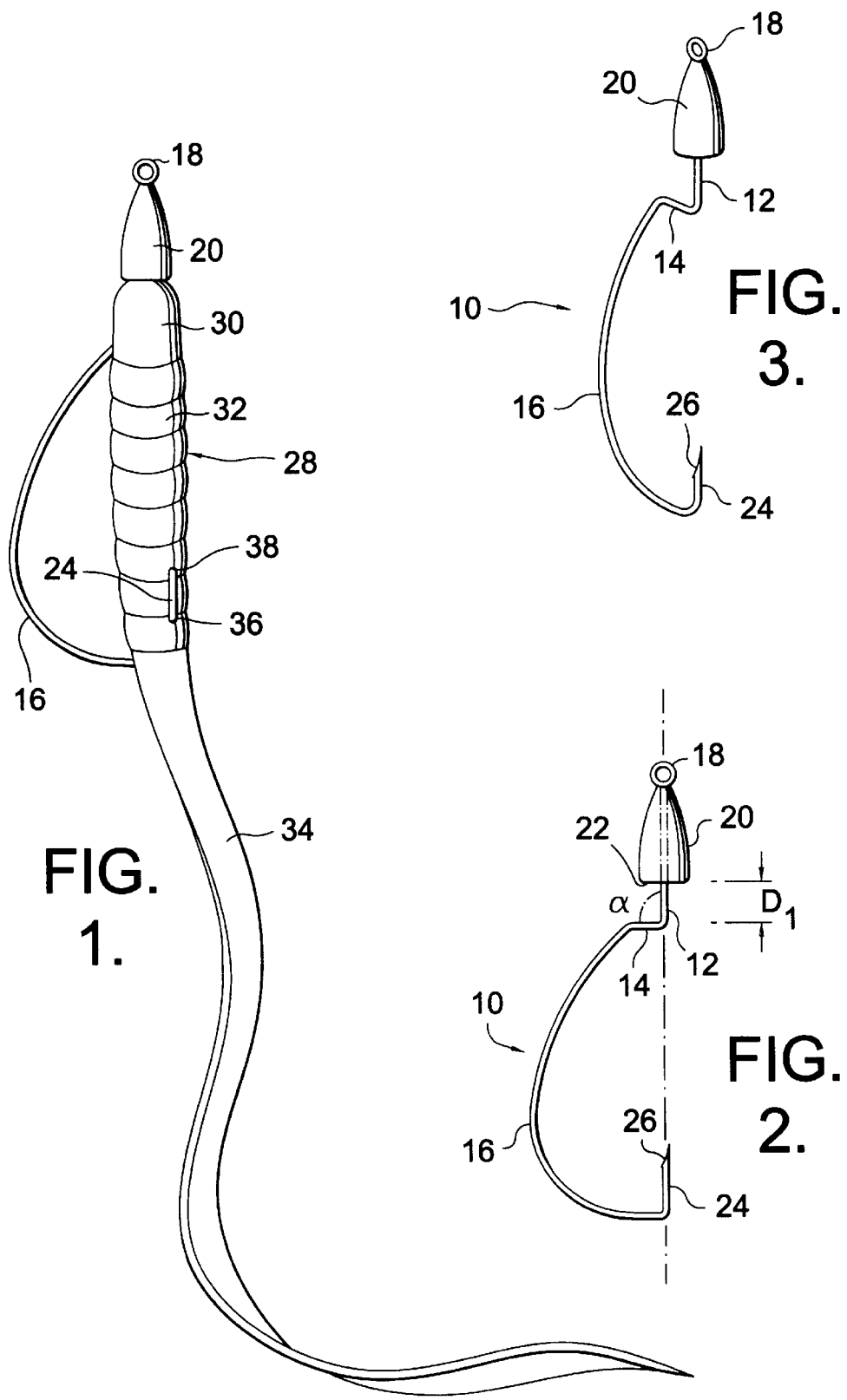

FISH HOOK

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to a fish hook and more particularly to a fish hook having an extended shank and a weight attached thereto.

Bait such as live baits and plastic baits are used extensively by anglers for attracting and ultimately catching fish. Typical live baits include worms, crawfish and minnows. Typical plastic baits include worms, lizards, tube baits and craws. Oftentimes, these baits are flexible and difficult to secure properly on the hook. By example, a worm (whether live or plastic) is placed on a conventional hook by securing one end of the worm on the shank of the hook and embedding the barb section of the hook at a distance from the end. Specifically, the barb section is either placed in the center of the worm or embedded just below the surface of the worm. The latter technique involves directing the barb completely though the worm and placing the tip of the barb section back into the worm. This technique is commonly known as skin pegging.

Weights are oftentimes required to submerge the baits in the water. Generally, fishing line is threaded through a small bore located in the weight prior to tying the line to the hook. When the weight is in the proper position on the line, the weight abuts the eyelet of the hook. However, since the weight has a tendency to slide along the line away from the hook, anglers typically place or "peg" a toothpick within the bore of the weight. The portion of the toothpick not in the weight is then broken off and removed. Thus, the line is compressed between the toothpick and bore sidewalls to hold the weight in the desired position.

However, the use of conventional weights and hooks is undesirable for a number of reasons. First, when the bait is placed on a conventional hook and the weight is secured to the line, the bait is oftentimes out of alignment with the weight. When the weight is not aligned with the bait, the imbalance created causes the bait to spin and appear crooked in the water. This unnatural motion is not as attractive to fish as a properly aligned bait. To obtain some degree of balance, anglers are required to place the barb of the hook within the center of the bait rather than skin pegging the bait. When the hook is embedded in this position, it is significantly more difficult to properly set the hook within the fish's mouth when it strikes on the bait, and fish are frequently missed.

An additional problem with conventional hooks is that the bait tends to slide on the hook since only a small portion of the bait is held on the shank, and nothing prevents that portion from sliding on the hook. It is particularly difficult to place large plastic bait on the hook since the drag created by the weight is increased and the amount of the bait held on the shank is minimal.

Additionally, the practice of pegging the weight to the line by the use of a toothpick tends to nick or otherwise weaken the line at the area of the line within the weight. This denigration may cause the line to ultimately break when the lure is temporarily snagged or upon landing a fish. Moreover, after time, the wood toothpick softens after it becomes saturated. Once the toothpick becomes soft, the weight may begin to slide on the line.

SUMMARY OF THE INVENTION

It is an object of the present invention to provide a fish hook that has an elongated shank and a weight secured thereto that properly secures, aligns and balances the bait secured to the hook.

In accordance with these and other objects evident from the following description of a preferred embodiment of the invention, a fish hook is provided which includes an elongated shank having a first attaching end and a second end. A locking bend shoulder extends at an angle from the second end of the shank. A weight is secured to the shank between the first attached end and the second end of the shank. The weight is located at a distance from the locking bend shoulder so that the bait is capable of being secured on the shank. The fish hook has a curved section terminating in a barb section. The barb section of the hook is axially aligned with the shank so that the bait is properly balanced on the hook when secured to the shank and the barb section.

In accordance with another aspect of the invention, a fish hook comprising an elongated shaft having a first attaching end and a second end is provided. The fish hook further includes a locking bend shoulder extending at an angle from the second end of the shank. A weight is secured to the shank between the first attaching end and the second end at a distance from the locking bend shoulder. The first end of the bait is bounded by and held between the weight and the locking bend shoulder.

By providing a fish hook in accordance with the present invention, numerous advantages are achieved. For example, by providing an elongated shank having a weight secured thereto and a barb section oriented linearly with respect to the shank, the bait is substantially aligned with the weight. Thus, the bait appears natural in the water and is significantly more attractive to the fish. In addition, the use of the fish hook allows the bait to be skin pegged rather than embedded deep within the bait without disrupting the balance of the bait. Yet another advantage is that the bait is effectively secured to the hook at the portion of the elongated area of the shank between the weight and the locking bend shoulder since the weight and locking bend shoulder bound the end of the bait on either side. Also, the line denigration resulting from pegging the line with a toothpick is avoided by placing the weight on the shank.

BRIEF DESCRIPTION OF SEVERAL VIEWS OF THE DRAWING

The preferred embodiment of the present invention is described in detail below with reference to the attached drawing, wherein:

FIG. 1 is a perspective view of a fish hook constructed in accordance with the preferred embodiment;

FIG. 2 is a side elevational view of the fish hook with phantom lines to demonstrate the portion of the elongated shank within the weight; and FIG. 3 is a side elevational view of the fish hook in combination with a plastic bait to illustrate the proper alignment of the bait with respect to the hook.

DETAILED DESCRIPTION OF THE INVENTION

As shown in FIG. 1, a fish hook constructed in accordance with the preferred embodiment of the present invention is designated generally by the numeral 10. Fish hook 10 broadly includes an elongated shank 12, a locking bend shoulder 14 and a curved section 16.

With reference to FIGS. 1 and 2, the elongated shank 12 has an eyelet 18 at one end. At the opposing end, locking bend shoulder 14 extends from the shank. The length of shank 12 is significantly longer than in conventional hooks. In the preferred embodiment, to provide a hook for most baits suitable for bass fishing, the length of the shank is about 1 to 1 ¼ inches.

A bullet weight 20 is secured to elongated shank 12 between eyelet 18 and locking bend shoulder 14. Preferably, the bullet weight 20 extends from the eyelet 18 to a position along shank 12 at a distance from locking bend shoulder 14. With particular reference to FIG. 2, in the preferred embodiment, the distance D1 between the bottom end 22 of bullet weight 20 and locking bend shoulder 14 is between 5/16 to ½ inch.

As best shown in FIG. 2, the bullet weight 20 is formed about shank 12 at the central axis of the weight. Thus, the bullet weight 20 is balanced about the shank 12. For the preferred dimensions of the shank 12 and distance D1, weights of ⅛ to ½ ounces are particularly effective. Preferably, the bullet weight 20 is made of lead and formed about the shank by a centrifugal molding process. However, the weight may be secured to the shank by any of a number of other processes such as soldering, adhering or compressing the weight about the shank. Also, the weight may be formed of any of a number of materials such as other relatively dense metals. While the bullet configuration is preferred, weights of other shapes and sizes may be used in accordance with the present invention, particularly those shapes that may be evenly balanced about a central axis. Also, the weights may be painted, glossed or otherwise decorated to attract fish such as by dipping or spraying the weights.

Locking bend shoulder 14 extends from shank 12 at an angle α. Preferably, angle α is slightly less than 90° and, most preferably, between 85 to 89°. The curved section 16 extends away from locking bend shoulder 14 and terminates in a barbed section 24. Also, the curved section 16 is preferably co-planar with eyelet 18.

Barb section 24 has a barb 26 near the terminal end. As best shown in FIG. 2, the barb section 24 is generally linear and is positioned axially with respect elongated shank 12 and the central axis of bullet weight 20.

Curved section 16 defines an extra wide gap that allows the barb section 24 to penetrate the fish's mouth at a distance from the opening of the mouth. Generally, an extra wide gap is typified by the exaggerated arcuate nature of the curved portion opposite the more linear, barb section. This allows the worm to move within the space defined by the curved portion while providing space between the barb section and worm for the fish to bite down around the barb section. Specifically, the extra wide gap of the curved section has the same curvature as the extra wide gap type hook sold by Gamakatsu®. For instance, the curved portion has the same curved section as the Gamakatsu® extra wide gap hook having a 2/0 dimension (indicating the distance from the second end of the shank and the tip of the barb section) when used with ⅛ and 3/16 ounce weights. Likewise, the curved portion has the same curved section as the extra wide gap Gamakatsu® hook having a 4/0 dimension for hooks having 3/16, ¼, 5/16, ⅜ and ½ ounce hooks.

In operation, as best shown in FIG. 3, a bait such as a worm 28 is secured to hook 10 by piercing through first end 30 of the worm with barb section 24. The barb section 24 exits first end 30 at a distance generally equal to distance D1 between the bottom end of bullet weight 20 and locking bend shoulder 12. Next, the first end 30 of worm 28 is slid along the remainder of curved section 16 and over locking bend shoulder 12 and onto the exposed portion of elongated shank 12. Once on shank 12, the portion of first end 12 is bounded by and held firmly between bullet weight 20 and locking bend shoulder 12. Since angle α is slightly less than 90°, the first end 30 has less of a tendency to slide from the desired position illustrated in FIG. 3.

Once the first end 30 is in the proper position, the barb section 24 is placed through the body 32 of worm 28. To skin peg the worm 32, the barb section 24 exits the opposing side of worm 28 at point 36 and re-enters into the worm 32 at a point 38 so that the barb 26 is slightly below the surface of the worm. In this position, the body 32 of worm 28 is in substantially linear alignment with the axis of shank 12, bullet weight 20 and eyelet 18. Also, the remainder of the worm extending beyond the hook, such as tail 34, is aligned with the body 32 and reacts properly in the water. Conversely, conventional hooks do not allow the weight, bait body and bait tail to maintain proper balance when skin pegged.

The worm 28 is firmly held in this position so that the worm body 32 and worm tail 42 move naturally in the water when reeled in by the angler. The position allows the angler to effective flip, pitch or other manipulate the plastic bait to effectively attract and ultimately catch fish.

When the hook and worm are cast and allowed to sink to a resting position on the lake's bottom, the curved section 16 of the hook typically lays on the bottom surface. The co-planar relationship of the eyelet 18 and curved section 16 causes the barb section 24 to turn upwardly when the angler begins drawing the lure towards the angler. Thus, it is less likely that the hook becomes snagged on the structure defining the lake's bottom. More importantly, when the hook is set by the angler, the barb section 24 tends to turn upwardly to engage the solid, upper surface of the fish's mouth. This causes the hook to be held with the fish's mouth and prevents fish from eluding the angler.

Although the invention has been described with reference to the preferred embodiment illustrated in the attached drawing figures, it is noted that the substitutions may be made and equivalents employed herein without departing from the scope of the invention as recited in the claims. For instance, for particular large or small plastic baits, the relative dimensions of the shank, weight and distance D1 may be varied with respect to one another without departing from the inventive concept. Also, the hooks may be used with a variety of live and synthetic baits such as tube baits, craws and lizards.

What is claimed is:

1. A fish hook for use with a bait having a first end, the hook comprising:

an elongated shank having a first attaching end and a second end;

a locking bend shoulder extending at an angle from said second end of said shank, wherein said angle between said shank and said locking bend shoulder is less than ninety degrees;

a weight having sufficient heaviness to submerge the bait, said weight fixedly secured to said shank between said first attaching end and said second end, said weight positioned on said shank at a distance from said locking bend shoulder so that the first end of the bait is capable of being secured on the shank, and a curved section extending from said locking bend shoulder, said curved section terminating in a barb section, wherein said barb section is generally axially aligned with said shank so that the bait is properly balanced when secured to the shank and the barb section.

2. The fish hook of claim 1 wherein said angle is between 85 and 89°.

* * * * *